(12) United States Patent
Gillis et al.

(10) Patent No.: US 6,459,550 B1
(45) Date of Patent: Oct. 1, 2002

(54) ACTIVE DAMPING CONTROL FOR A DISK DRIVE

(75) Inventors: Donald Ray Gillis; Mike Suk, both of San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 19 days.

(21) Appl. No.: 09/677,422

(22) Filed: Oct. 2, 2000

(51) Int. Cl.7 .............................................. G11B 21/12
(52) U.S. Cl. .................................................. 360/265.1
(58) Field of Search ....................... 360/265.1, 264.1, 360/264, 244, 244.5; 310/333

(56) References Cited

U.S. PATENT DOCUMENTS

| | | | | |
|---|---|---|---|---|
| 2,443,471 A | * | 6/1948 | Mason | 333/187 |
| 5,315,203 A | * | 5/1994 | Bicos | 310/326 |
| 5,323,082 A | * | 6/1994 | Wright | 310/328 |
| 5,550,688 A | * | 8/1996 | Aoyagi et al. | 360/99.08 |
| 6,048,276 A | * | 4/2000 | Vandergrift | 473/316 |
| 6,069,433 A | * | 5/2000 | Lazarus et al. | 310/333 |
| 6,268,682 B1 | * | 7/2001 | Audren | 310/333 |

* cited by examiner

*Primary Examiner*—David Hudspeth
*Assistant Examiner*—Angel Castro
(74) *Attorney, Agent, or Firm*—John L. Rogitz

(57) ABSTRACT

An active damping control for a disk drive includes an i.d. crash stop and an o.d. crash stop which constrain the motion of an actuator arm. Each crash stop includes an inner core manufactured from a material that generates current when mechanically strained. The inner core of each crash stop is connected to a circuit that includes an energy dissipating element that dissipates energy received from either crash stop. Thus, when the actuator arm collides with either crash stop, the rebound of the actuator arm off the crash stop is minimized.

30 Claims, 2 Drawing Sheets

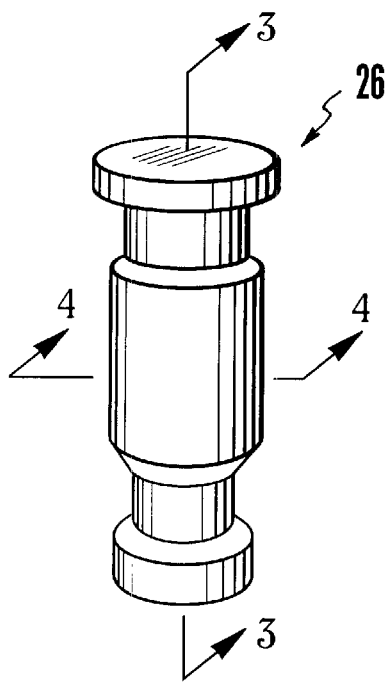
Fig. 2
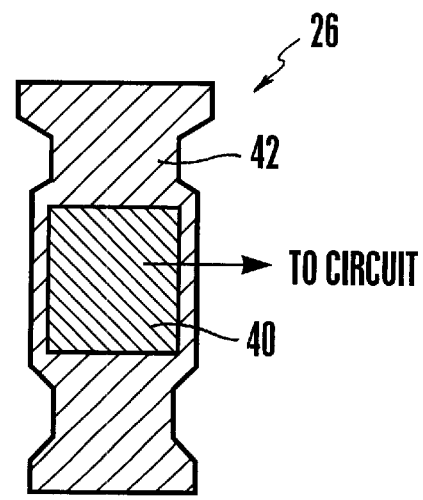
Fig. 3
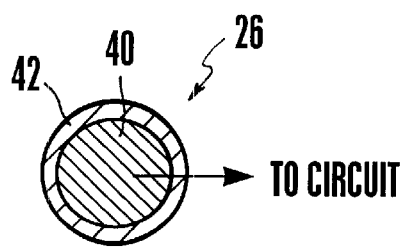
Fig. 4
Fig. 5
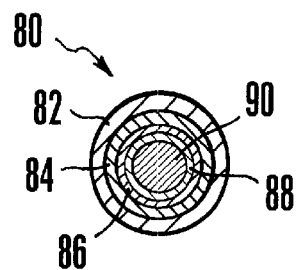
Fig. 6

ACTIVE DAMPING CONTROL FOR A DISK DRIVE

FIELD OF THE INVENTION

The present invention relates generally to disk drives crash stops found in hard disk drives.

BACKGROUND OF THE INVENTION

A hard disk drive includes a storage disk having a read/write surface and an actuator arm supporting a read/write head. As the actuator arm rotates about a pivot point, the read/write head moves over the data tracks to read data from the disk or to write data to the disk.

To prevent the read/write head from moving beyond predetermined displacement limits, the disk drive includes crash stops which constrain the displacement of the actuator arm. The present invention understands that when the actuator arm reaches a crash stop and collides with the crash stop, the actuator arm can rebound off of the crash stop. In order to prevent damage to the read/write head and the disk and to optimize drive performance, it is desirable to minimize the rebound. U.S. Pat. Nos. 5,864,449 and 5,905,606, assigned to IBM Corp. and incorporated herein by reference, provide systems for damping the collision between the actuator arm and the crash stop. While these systems are effective for their intended purposes, the present invention recognizes that an improved way to absorb mechanical energy in a disk drive crash stop can be provided.

SUMMARY OF THE INVENTION

A disk drive includes at least one mechanical crash stop. At least a portion of the mechanical crash stop includes a material that generates current when mechanically strained. Preferably, this portion of the crash stop is connected to an energy dissipating circuit. In a preferred embodiment, the circuit includes a resistor that thermally dissipates the energy received from the crash stop. Alternatively, the circuit is connected to an actuator coil in a manner as to control the motion of an actuator. Preferably, the crash stop is at least partially manufactured from a piezoelectric material.

In another aspect of the present invention, a data storage apparatus includes at least one mechanical crash stop. In this aspect, at least one circuit is connected to the mechanical crash stop.

In yet another aspect of the present invention, a mechanical crash stop for use in a disk drive is at least partially made from a material that generates energy when mechanically strained.

The present invention will now be described, by way of example, with reference to the accompanying drawings, in which:

BRIEF DESCRIPTION OF THE DRAWINGS

FIG. 2 is a perspective view of a crash stop;

FIG. 3 is a cross-sectional view of the crash stop taken along line 3—3 in FIG. 2;

FIG. 4 is a cross-sectional view of the crash stop taken along line 4—4 in FIG. 2;

FIG. 5 is a cross-sectional view of an alternative crash stop; and

FIG. 6 is a cross-sectional view of yet another alternative crash stop.

DESCRIPTION OF AN EMBODIMENT OF THE INVENTION

Figure 1:
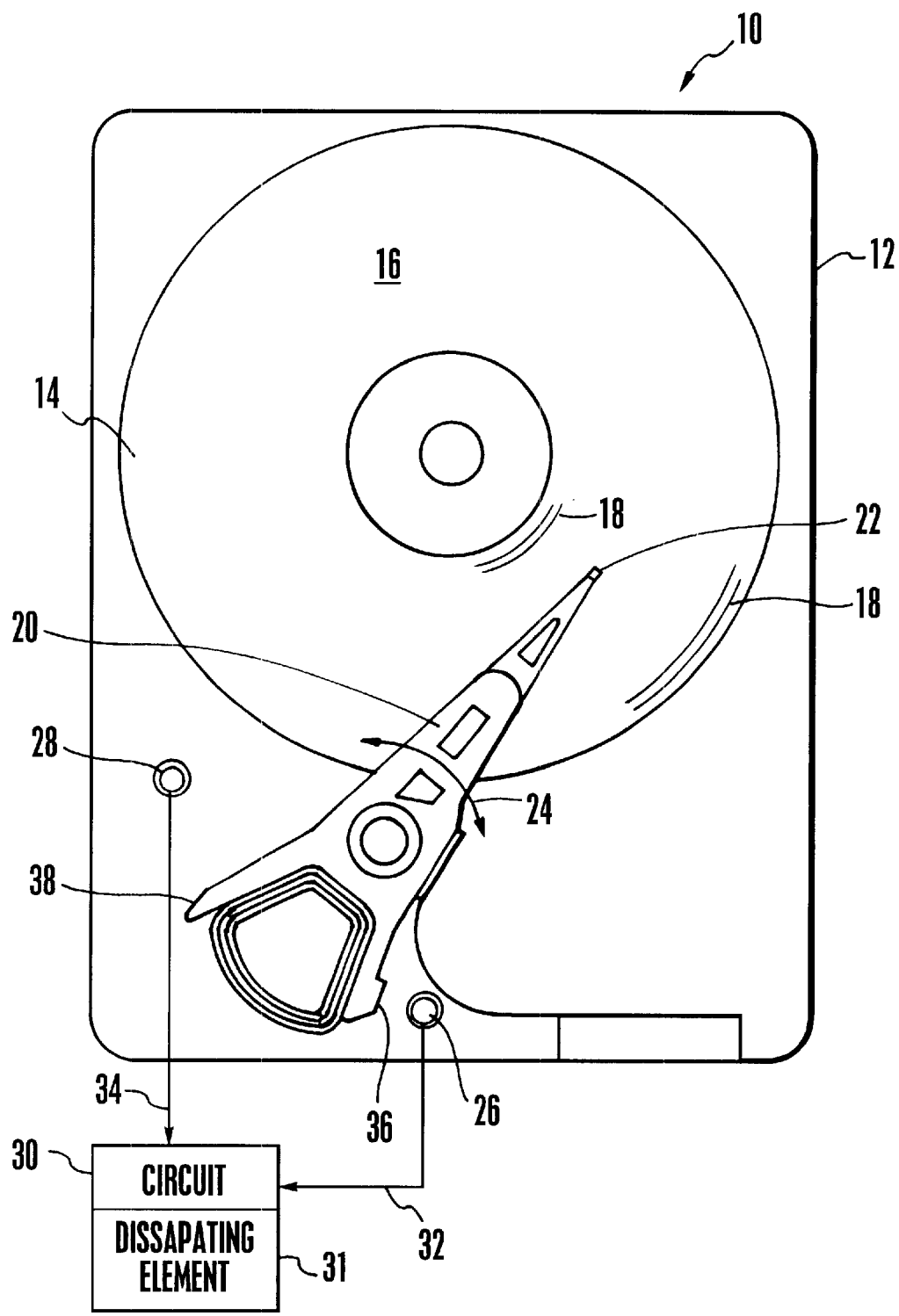
FIG. 1 is a top plan view of a disk drive in which the active damping control of the present invention can be installed.

Referring initially to FIG. 1, a disk drive is shown and generally designated 10. FIG. 1 shows that the disk drive 10 includes a housing 12. Within the housing 12 is at least one disk 14 having a read/write surface 16. The read/write surface 16 includes plural concentric data tracks 18. As shown in FIG. 1, the disk drive 10 includes an actuator arm 20 that supports a read/write head 22. The actuator arm 20 is driven by an actuator coil (not shown), and as the actuator arm 20 pivots back and forth, as indicated by arc 24, the read/write head 22 moves across the data tracks 18 of the disk 14.

FIG. 1 shows that the disk drive 10 includes an inner diameter (i.d.) crash stop 26 and an outer diameter (o.d.) crash stop 28 that constrain the displacement of the actuator arm 20 and prevent the read/write head 22 from moving beyond predetermined limits, e.g., the inner most data track 18 and the outer most data track 18. As discussed in greater detail below, each crash stop 26 is manufactured, at least in part, from a material, e.g., a piezoelectric material, that generates a current when mechanically strained.

A circuit 30 that includes an electrical energy dissipating element 31 is connected to the i.d. crash stop 26 via an electrical line 32. The circuit 30 is also connected to the o.d. crash stop 28 via an electrical line 34. Accordingly, any electrical signal generated by the i.d. crash stop 26 or the o.d. crash stop 28 is conducted to the circuit 30.

As shown in FIG. 1, the actuator arm 20 includes an i.d. limit contact face 36 and an o.d. limit contact face 38. As the read/write head 22 moves toward the inner most data track 18, the i.d. limit contact face 36 approaches the i.d. crash stop 26. On the other hand, as the read/write head 22 moves toward the outer most data track 18, the o.d. limit contact face 38 approaches the o.d. crash stop 28. When the read/write head 22 reaches the inner most data track 18 or the outer most data track, the i.d. limit contact face 36 and the o.d. limit contact face 38 contact the i.d. crash stop 26 and the o.d. crash stop 28, respectively, causing either crash stop 26, 28 to generate impulse energy that is conducted to the circuit 30.

It is to be appreciated that the dissipating element 31 of the circuit 30 can include at least one resistor that thermally dissipates the impulse energy from either the i.d. crash stop 26 or the o.d. crash stop 28 when impacted by the actuator arm 20. Consequently, the dissipating element 31 in the circuit 30 reduces the rebound caused by the impact of the actuator arm 20 with either crash stop 26, 28. Alternatively, the dissipating element 31 of the circuit 30 can include an actuator coil that drives the actuator arm 20. In this case, the current generated by the impact is directed to the actuator coil so that it biases the actuator in a direction opposite the rebound in order to damp the rebound. This example is particularly useful for load/unload drives, and as such, aids in keeping the suspension on the ramp.

Referring now to FIGS. 2 through 4, details of the construction of the i.d. limit crash stop 26 can be seen. FIGS. 2 through 4 show that the crash stop 26 is generally cylindrical and includes an inner core 40 manufactured from a material that generates current when mechanically strained. The inner core 40 is surrounded by a preferably plastic outer jacket 42. The inner core 40 of each crash stop 26 is electrically connected to the circuit 30. As such, any current generated by mechanically straining the inner core 40 of each crash stop 26 is conducted to the circuit 30 as described above. In a preferred embodiment, the inner core 40 is made from a piezoelectric material or a material with magnetoresistive properties.

It is to be understood that the crash stops 26, 28 can be made entirely of a material that generates current when mechanically strained, thus eliminating the need for the outer jacket 42. Alternatively, the outer jacket 42 may be made from a material that generates current when mechanically strained and the inner core 40 may be plastic. Moreover, as contemplated by the present invention, each crash stop 26, 28, can simply include a patch of a material that generates current when mechanically strained placed in the impact zone between the actuator arm 20 and the crash stop 26, 28. Preferably, the i.d. limit crash stop 26 is identical to the o.d. limit crash stop 28, but it is to be appreciated that the crash stops 26, 28 may differ in construction—as long as they include a portion manufactured from a material that generates current when mechanically strained.

Referring now to FIG. 5 an alternative embodiment of the i.d. limit crash stop is shown and generally designated 50. FIG. 5 shows that the crash stop 50 includes, e.g., a first layer 52, a second layer 54, a third layer 56, a fourth layer 58, a fifth layer 60, a sixth layer 62, a seventh layer 64, an eighth layer 66, and a ninth layer 68. It is to be understood that the crash stop 50 may include fewer or more layers than those shown in FIG. 5. As intended by this embodiment of the present invention, at least one of the layers 52, 54, 56, 58, 60, 62, 64, 66, 68 is manufactured from a material that generates current when mechanically strained and is connected to the circuit 30.

Referring to FIG. 6 another alternative embodiment of the i.d. limit crash stop is shown and generally designated 80. FIG. 6 shows that the crash stop 80 includes a first circular layer 82, a second circular layer 84, a third circular layer 86, and a fourth circular layer 88 disposed around a 20 core 90. As shown in FIG. 6, the circular layers 82, 84, 86, 88 are concentric with each other and the core 90. It is to be understood that the crash stop 80 may include fewer or more circular layers than those shown in FIG. 6. Moreover, it is to be understood that at least one of the layers 82, 84, 86, 88 is manufactured from a material that generates current when mechanically strained and that layer is connected to the circuit 30. Alternatively, the core 90 may be made from a material that generates current when mechanically strained. If so, the core 90 is connected to the circuit 30.

With the configuration of structure described above, it is to be appreciated that active damping control for a disk drive provides a device for effectively damping the rebound of the actuator arm 20 off the i.d. crash stop 26 or the o.d. crash stop 28.

While the particular ACTIVE DAMPING CONTROL FOR A DISK DRIVE as herein shown and described in detail is fully capable of attaining the above-described objects of the invention, it is to be understood that it is the presently preferred embodiment of the present invention and thus, is representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it is to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. section 112, sixth paragraph, unless the element is expressly recited using the phrase "means for."

What is claimed is:

1. A disk drive, comprising:

at least one mechanical crash stop, the mechanical crash stop including at least a portion being manufactured from a material that generates current when mechanically strained and being connected to a circuit that thermally dissipates the energy received from the crash stop.

2. The disk drive of claim 1, wherein the circuit includes a resistor that thermally dissipates the energy received from the crash stop.

3. The disk drive of claim 1, wherein the crash stop is at least partially manufactured from a piezoelectric material.

4. A disk drive, comprising:

at least one mechanical crash stop, the mechanical crash stop including at least a portion being manufactured from a material that generates current when mechanically strained and being connected to an actuator coil that dissipates the energy received from the crash stop.

5. The disk drive of claim 4, wherein the crash stop is at least partially manufactured from a piezoelectric material.

6. A data storage apparatus, comprising:

at least one mechanical crash stop, the mechanical crash stop including at least a portion being manufactured from a material that generates current when mechanically strained; and at least one circuit connected to the mechanical crash stop, the circuit including a resistor that thermally dissipates the energy received from the crash stop.

7. The data storage apparatus of claim 6, wherein the mechanical crash stop comprises:

an outer jacket; and an inner core disposed within the outer jacket, the inner core being manufactured from a material that generates energy when mechanically strained.

8. The data storage apparatus of claim 7, wherein the inner core of the crash stop is manufactured from a piezoelectric material.

9. The data storage apparatus of claim 6, wherein the mechanical crash stop comprises:

an inner core; and an outer jacket disposed around the inner core, the outer jacket being manufactured from a material that generates energy when mechanically strained.

10. The data storage apparatus of claim 6, wherein the crash stop comprises:

multiple concentric layers, at least one layer being manufactured from a material that generates energy when mechanically strained.

11. The data storage apparatus of claim 6, wherein the crash stop comprises:

multiple sandwiched layers, at least one layer being manufactured from a material that generates energy when mechanically strained.

12. A data storage apparatus, comprising:
at least one mechanical crash stop, the mechanical crash stop including at least a portion being manufactured from a material that generates current when mechanically strained; and
at least one circuit connected to the mechanical crash stop, the circuit being connected to an actuator coil that dissipates the energy received from the crash stop.

13. The data storage apparatus of claim 12, wherein the mechanical crash stop comprises:
an outer jacket; and
an inner core disposed within the outer jacket, the inner core being manufactured from a material that generates energy when mechanically strained.

14. The data storage apparatus of claim 13, wherein the inner core of the crash stop is manufactured from a piezoelectric material.

15. The data storage apparatus of claim 12, wherein the mechanical crash stop comprises:
an inner core; and
an outer jacket disposed around the inner core, the outer jacket being manufactured from a material that generates energy when mechanically strained.

16. The data storage apparatus of claim 12, wherein the crash stop comprises:
multiple concentric layers, at least one layer being manufactured from a material that generates energy when mechanically strained.

17. The data storage apparatus of claim 12, wherein the crash stop comprises:
multiple sandwiched layers, at least one layer being manufactured from a material that generates energy when mechanically strained.

18. A mechanical crash stop for use in a disk drive, wherein the crash stop is at least partially made from a material that generates energy when mechanically strained, the crash stop being connected to a circuit that thermally dissipates the energy received from the crash stop.

19. The mechanical crash stop of claim 18, wherein the circuit includes a resistor that thermally dissipates the energy received from the crash stop.

20. The mechanical crash stop of claim 18, wherein the mechanical crash stop comprises:
an outer jacket; and
an inner core disposed within the outer jacket, the inner core being manufactured from a material that generates energy when mechanically strained, the inner core being connected to the circuit.

21. The mechanical crash stop of claim 20, wherein the inner core of the crash stop is manufactured from a piezoelectric material.

22. The mechanical crash stop of claim 18, wherein the mechanical crash stop comprises:
an inner core; and
an outer jacket disposed around the inner core, the outer jacket being manufactured from a material that generates energy when mechanically strained, the outer jacket being connected to the circuit.

23. The mechanical crash stop of claim 18, wherein the crash stop comprises:
multiple concentric layers, at least one layer being manufactured from a material that generates energy when mechanically strained, the layer being connected to the circuit.

24. The mechanical crash stop of claim 18, wherein the crash stop comprises:
multiple sandwiched layers, at least one layer being manufactured from a material that generates energy when mechanically strained, the layer being connected to the circuit.

25. A mechanical crash stop for use in a disk drive, wherein the crash stop is at least partially made from a material that generates energy when mechanically strained, the crash stop being connected to an actuator coil that dissipates the energy received from the crash stop.

26. The mechanical crash stop of claim 25, wherein the mechanical crash stop comprises:
an outer jacket; and
an inner core disposed within the outer jacket, the inner core being manufactured from a material that generates energy when mechanically strained, the inner core being connected to the circuit.

27. The mechanical crash stop of claim 26, wherein the inner core of the crash stop is manufactured from a piezoelectric material.

28. The mechanical crash stop of claim 25, wherein the mechanical crash stop comprises:
an inner core; and
an outer jacket disposed around the inner core, the outer jacket being manufactured from a material that generates energy when mechanically strained, the outer jacket being connected to the circuit.

29. The mechanical crash stop of claim 25, wherein the crash stop comprises:
multiple concentric layers, at least one layer being manufactured from a material that generates energy when mechanically strained, the layer being connected to the circuit.

30. The mechanical crash stop of claim 25, wherein the crash stop comprises:
multiple sandwiched layers, at least one layer being manufactured from a material that generates energy when mechanically strained, the layer being connected to the circuit.

* * * * *